(12) United States Patent
Halse (10) Patent No.: US 6,786,063 B2
(45) Date of Patent: Sep. 7, 2004

(54) GAS CONDENSER

(75) Inventor: Helge-Ruben Halse, Kristiansand S. (NO)

(73) Assignee: Venturie AS, Søgne (NO)

( * ) Notice: Subject to any disclaimer, the term of this patent is extended or adjusted under 35 U.S.C. 154(b) by 0 days.

(21) Appl. No.: 10/204,503

(22) PCT Filed: Jul. 23, 2001

(86) PCT No.: PCT/NO01/00316

§ 371 (c)(1),
(2), (4) Date: Aug. 21, 2002

(87) PCT Pub. No.: WO02/08659

PCT Pub. Date: Jan. 31, 2002

(65) Prior Publication Data

US 2003/0037911 A1 Feb. 27, 2003

(30) Foreign Application Priority Data

Jul. 26, 2000 (NO) .......................................... 20003841

(51) Int. Cl.⁷ ............................... F17C 3/10; F28B 3/00
(52) U.S. Cl. ......... 62/611; 165/111 DC; 165/DIG. 162; 62/48.2
(58) Field of Search ......................... 62/611, 613, 48.2; 165/110 DC, 111 DC, DIG. 162

(56) References Cited

U.S. PATENT DOCUMENTS

| | | | |
|---|---|---|---|
| 2,381,403 A | * 8/1945 | Chisholm | 75/595 |
| 2,784,560 A | 3/1957 | Johnson, Jr. | |
| 3,733,838 A | * 5/1973 | Delahunty | 62/48.2 |
| 3,915,222 A | * 10/1975 | Hull | 165/111 |
| 3,921,412 A | 11/1975 | Heath et al. | |
| 3,981,156 A | * 9/1976 | Modisette et al. | 62/48.2 |
| 4,522,257 A | * 6/1985 | Wolfseder | 165/113 |
| 4,694,662 A | 9/1987 | Adams | |
| 2001/0042377 A1 | * 11/2001 | Pozivil | 62/48.3 |

FOREIGN PATENT DOCUMENTS

| | | | |
|---|---|---|---|
| GB | 869355 A | * 5/1961 | ........... 165/111 DC |
| JP | 0184489 A | * 10/1983 | ........... 165/111 DC |
| NO | 305525 | 6/1999 | |

OTHER PUBLICATIONS

U.S. Publication No. 2003/0101868 A1; Method, Apparatus and System for the Condensation of Vapours and Gases; Publication Date Jun. 5, 2003; Inevntor: Odd G. Muller.

* cited by examiner

Primary Examiner—William C. Doerrler
(74) Attorney, Agent, or Firm—Andrus, Sceales, Starke & Sawall, LLP (57) ABSTRACT

Gas condenser (2) arranged to condense gas/vapour (4) evaporating from a volatile liquid (6) being stored, for example, in a storage tank. The gas/vapour (4) is conducted into a gas chamber (16) provided with openings, possibly also nozzles (76), the gas chamber (16) being placed in a surrounding housing (36). Thereafter, the gas/vapour (4) is sucked into at least one venturi section (62, 64), wherein the liquid (6), for example, is flowing with a static underpressure relative to the inflowing gas/vapour (4). Via at least one expansion section (88, 90), a mixture (92) of gas/vapour (bubbles) (4) and liquid (6) flows onward to a condensing chamber (98), through which the static pressure of the liquid (6) increases and the gas/vapour (4) is condensed, after which the mixture (92) is conducted back to, for example, the storage tank. By means of one or several adjusting devices arranged to the gas condenser (2), the shape of the slot volume of the venturi section(s) (62, 64), possibly also the slot volume of expansion section(s) (80, 90), and thus the course of pressure through it/them, may be optimally adjusted/changed/adapted to the current operating condition and the current gas condensing need.

21 Claims, 7 Drawing Sheets

GAS CONDENSER

CROSS REFERENCE TO RELATED APPLICATION

The present application is the U.S. national stage application of International Application PCT/NO01/00316, filed Jul. 23, 2001, which international application was published on Jan. 31, 2002 as International Publication WO 02/08659. The International Application claims priority of Norwegian Patent Application 20003841, filed Jul. 26, 2000.

FIELD OF THE INVENTION

This invention concerns a device arranged to condense gas/vapour, for example hydrocarbons in gas phase, from volatile liquids, for example hydrocarbons in liquid phase, the device hereinafter and simplistically denoted as a gas condenser.

BACKGROUND OF THE INVENTION

Upon storage and transport of volatile liquids, for example crude oil or crude oil products in liquid state, a portion of the liquid normally evaporates, so that gas/vapour, for example hydrocarbon gas, is collected above the liquid surface of the container or tank in which the liquid is stored. Within an enclosed container/tank, the evaporation results in pressure build-up, so that the pressure, upon a given maximum pressure, must be reduced by venting out the gas/vapour, for example through suitable valves, the gas/vapour normally being released to the surrounding atmosphere.

Upon loading a hydrocarbon liquid, for example, to a storage tank, the storage tank possibly being partially filled with an equivalent or similar liquid, the liquid filled thereto will displace gas/vapour present in the storage tank together with potential gas/vapour evaporating from the storage tank liquid, the gas/vapour normally being released to the surrounding atmosphere.

PRIOR ART

Upon transport, storage or loading of, for example, crude oil, possibly crude oil products, which, at atmospheric or close to atmospheric normalcy, exist(s) in liquid phase, it is common practice to release, at a given maximum pressure, evaporation gasses/vapours directly into the surrounding atmosphere, the container/tank of the liquid/gas being provided with one or more pressure valves, so-called snifting valves, which, at a given maximum pressure, open and release the gas/vapour.

Moreover, and in connection with storage and transport of refrigerated liquid gas, several methods, devices and/or systems for condensing gas exist, including:

NO 305525 concerns a "method and device for storing and transport of liquidised natural gas";

U.S. Pat. No. 2,784,560 concerns a "method and device for the storing and handling of liquid gas"; while U.S. Pat. No. 3,733,838 concerns a "system for repeatedly liquefying the extract of a liquid gas".

The above-mentioned methods, devices and/or system comprise, among other things, suction and condensing devices for the handling of gas which has evaporated from refrigerated liquid gas.

Furthermore, the prior art represented by U.S. Pat. No. 3,921,412 concerns a "vapour recovery device utilising a condensing dispenser nozzle", the dispenser nozzle condensing vapour/gas which is being displaced when filling of liquid into a container, where the dispenser nozzle is placed in the filler opening of the container.

DISADVANTAGES OF THE PRIOR ART

A substantial disadvantage of releasing a hydrocarbon gas, for example, into the surrounding atmosphere, consists in the effluent/discharge potentially being harmful to the surrounding environment. Also, it is of economic interest to retain as much as possible of the hydrocarbon gas within the container or the tank, and preferably within the hydrocarbon liquid, inasmuch as the hydrocarbon gas is valuable and may be used for industrial purposes.

Disadvantageously, prior art according to NO 305525, U.S. Pat. Nos. 2,784,560 and 3,733,838 concern methods, devices and/or systems for condensing gas/vapour in connection with storage and transport of refrigerated liquid gas, and thus are not arranged to condense gas/vapour in connection with storing, transport, loading and unloading of, for example, crude oil or crude oil products which, at atmospheric or near-atmospheric normalcy, exist in liquid phase. Furthermore, the technical solutions described in NO 305525, U.S. Pat. Nos. 2,784,560 and 3,733,838 are comprehensive, complicated and expensive.

The technical solution described in U.S. Pat. No. 3,921,412 is limited to the condensing of gas/vapour being displaced during the filling of liquid into a container and does not concern condensing of gas/vapour evaporating from a liquid during transport or storage thereof.

Hence, no prior art technical solutions seem to exist to condense gas/vapour, for example hydrocarbons in gas phase, from volatile liquids, for example hydrocarbons in liquid phase, and which are arranged to enable simple and efficient condensing of larger volumes of such gases/vapours.

THE OBJECTIVE OF THE INVENTION

The objective of the invention is to provide a gas condenser arranged to condense gas/vapour, for example hydrocarbons in gas phase, from volatile liquids, for example hydrocarbons in liquid phase, the gas condenser being arranged to provide a simple and efficient condensing of larger volumes of such gases/vapours.

Another objective of the invention is to provide a gas condenser which, if desired, directly or indirectly may be adapted to the current gas/vapour condensing need, considering that the need may increase/decrease relative to increasing/decreasing evaporation and/or displacement of such a gas/vapour, and the gas condenser possibly may be connected to other necessary equipment, devices and/or appliances in order to, for example, control/adjust flow parameters of the fluids which, during use of the gas condenser, flow through it, possibly also in order to pre-treat and/or after-treat, for example remove air or air components within, said fluids flowing through the gas condenser.

How to Achieve the Objective

The objective is achieved by using one or several gas condensers according to the invention, the following description specifying in a simplified version, however, the utilisation of only one gas condenser, the utilisation of several gas condensers only providing a greater gas/vapour condensing capacity and no different mode of operation than that of utilising one gas condenser only.

The volatility of a liquid indicates the degree of ease at which a liquid will evaporate. A liquid possessing a low boiling point and a high vapour pressure (relative to the ambient condition) indicates volatility in a liquid. Concerning this, a liquid, for example a hydrocarbon liquid, may consist of several liquid components, the liquid components being more or less volatile relative to one another, and especially relative to an overlying gas volume within a tank/container. At a certain pressure- and temperature condition, each of the liquid components possesses an individual boiling point and vapour pressure, the liquid components possessing the lowest boiling point and the highest vapour pressure evaporating first. Thus, a mixture of various gas components may gradually emerge within, for example, a storage tank.

Upon evaporation of a volatile liquid, for example a hydrocarbon liquid, being stored within a tank, the evaporation normally, but not always, will be influenced by the following parameters and in the following way:

The evaporation increases when the gas-exposed surface area of the liquid (liquid surface area) increases; the evaporation increases when the liquid volume increases (provided the liquid surface area increases simultaneously); the evaporation increases when the gas volume/liquid volume ratio within the tank increases; the evaporation decreases when the liquid ambient pressure increases; the evaporation increases when the liquid ambient temperature increases; the evaporation increases when the liquid storage time within the tank increases; the evaporation varies dependent on the liquid component composition, and in such a way that the evaporation decreases when the boiling point of a liquid component increases, while the evaporation increases when the vapour pressure of a liquid component increases.

During transport of, for example, crude oil in a tanker, stirring devices, so-called agitators, are often used to stir the crude oil in the bottom layer of the tank(s). This is done in order to prevent extensive segregation of the crude oil, thereby preventing the heaviest and most viscous crude oil components from sinking to the bottom of the tank(s) and, by so doing, impeding the subsequent unloading of the crude oil. This stirring of the crude also facilitates increased evaporation of the most volatile liquid components of the crude oil, and therefore it is desirable to restrict the agitation to a minimum. Moreover, the presence of so-called inert gases within such a tank will lead to increased evaporation from the crude oil.

Upon transport, storage, loading or unloading of such a volatile liquid, some parameters, however, for example the liquid surface area, the liquid storage time within the tank and the liquid component composition, may remain constant or approximately constant, for example in a time period during transport of crude oil on a tanker. Other parameters, however, may vary more or less, for example the liquid temperature and/or pressure may vary dependent on fluctuating climatic conditions during, for example, intercontinental tanker shipment of crude oil. The ratio of gas volume/liquid volume within the tank may also vary, for example at onshore-based petrol storage tanks, the draining and filling of volatile liquid being carried out frequently, causing the gas volume/liquid volume ratio within the tank to vary frequently. Otherwise the liquid component composition may also vary, for example in tanker shipment of crude oil, possibly shipping different types of crude oil at each trip. Hence, it is obvious that the evaporation from such volatile liquids may vary largely relative to variations in the above-mentioned parameters.

Furthermore, in the filling/loading of, for example, a hydrocarbon liquid, the displacement of gas/vapour in the tank may increase as a function of increased filling velocity of the liquid, the gas/vapour normally being released directly into the surrounding atmosphere.

Gas/vapour, hereinafter denoted as a gas, evaporating from such a volatile liquid is conducted to the gas condenser wherein the gas is conducted into a liquid flow, the flowing liquid preferably, but not necessarily, being comprised of the volatile liquid from which the gas evaporated, in which liquid the gas is condensed into gas condensate through a so-called process of bubble condensation, after which the gas condensate is returned to the liquid, and preferably to the bottom layer of the liquid where the hydrostatic pressure of the liquid is the largest. Returning the condensate to the bottom layer of the liquid is favourable with respect to reducing the evaporation, the associated hydrostatic pressure causing the condensate to largely remain dissolved in the liquid. Through time, and due to a lower specific gravity than that of, for example, crude oil, the condensate will seek to rise to the surface of the liquid, while returning the condensate to the bottom of the liquid cause the condensate to use more time, and to encounter a larger liquid volume, than had the condensate been returned at a shallower layer within the liquid. The gas condenser is preferably placed in proximity of, and outside of, the liquid container/tank, which is favourable in the event of maintaining or repairing the gas condenser. Moreover, and based on safety and operational considerations, the gas condenser must be provided with pressure-sealing connections in necessary places for the gas condenser to work satisfactorily.

In the following description of mode of operation for the gas condenser, the relative place/position of the main components relative to each other is given for a gas condenser placed in a vertical operational position. Furthermore, such a gas condenser may be used in non-vertical operational positions to the extent that the gravitational influence on the flowing fluids of the gas condenser is considered, and is compensated for in terms of pressure. In principle, the gas condenser is comprised by, or is arranged with, the following main components:

At least one gas supply pipe or at least one gas supply conduit, hereinafter denoted as a gas supply pipe; a gas chamber located centrally within the gas condenser, to which gas chamber the gas supply pipe(s) is/are connected, preferably, in the lower section of the gas chamber; a suitable number of openings in the gas chamber walls, preferably in the upper and possibly in the intermediate section of the gas chamber; a housing/container surrounding the gas chamber, hereinafter denoted as a housing; at least one liquid supply pipe/conduit, hereinafter denoted as a liquid supply pipe, possibly also a liquid supply manifold connected to the housing, preferably in the upper section of the housing; a condensing chamber, preferably arranged within the lower section of the housing; at least one venturi section placed between the liquid supply pipe, possibly the liquid supply manifold, and the condensing chamber, the venturi section concurrently being comprised by the slot, or the slot volume, between the gas chamber wall(s) and the housing wall(s), as the slot, viewed in the downstream direction, is comprised of successive and constricted flow (cross) sectional areas which collectively constitute said slot volume; at least one grate placed in the condensing chamber, preferably in its upper section and immediately downstream of each venturi section; and at least one outlet pipe, hereinafter denoted as a liquid outlet pipe, for a mixture consisting of a liquid supplied and of condensed gas, the liquid outlet pipe(s) being connected preferably to the lower section of the condensing chamber.

Upon evaporating gas from the volatile liquid, the gas will rise naturally and be concentrated in the tank volume above the liquid surface, which, upon storage and transport of crude oil and some crude oil products, normally occurs at a pressure somewhat higher than the atmospheric pressure, this overpressure being used, for example, to drive the gas onward to and into the gas supply pipe of the gas condenser. Thereafter, the gas is conducted into preferably the lower section of the centrally located gas chamber of the gas condenser and onward through said openings in the gas chamber walls. The openings are preferably provided with suitable nozzles, through which the gas is conducted into the venturi section(s) of the gas condenser. Concurrently, and by means of at least one pumping device, a gas-compatible liquid is conducted through the liquid supply pipe and possibly through a liquid supply manifold, the liquid herein flowing at a static pressure larger than the static pressure of the gas in the gas chamber. A potential liquid supply manifold is used preferably to distribute evenly the liquid flow to the inlet opening(s) of the venturi section(s), and especially when the liquid flow is to be distributed evenly over longitudinally extended inlet openings. At said static pressure, the liquid continues flowing in a downstream direction into the inlet opening(s) of the venturi section(s).

Concurrently, the gas is conducted in a downstream direction from the gas chamber and through said openings, possibly nozzles, in the gas chamber wall(s), thereafter being mixed together with the flowing liquid in the venturi section(s), hereinafter denoted as a venturi section. This course of flow presupposes that the gas flows from a higher static pressure to a lower static pressure, concluding from this that the liquid in the venturi section must be arranged with a static underpressure relative to the static pressure immediately upstream of the outlets of said openings, possibly nozzles. The underpressure is obtained by using a well-known principle of thermodynamic equilibrium (conservation of energy) in a fluid flow, cf. the Bernoulli equation, equilibrium being maintained within the flow circuit by keeping constant the sum of the static and dynamic pressures of the fluid, with the exception of static pressure loss caused by friction and turbulence. If the fluid, a liquid in this context, within one region of the flow circuit, for example within the venturi section, is exposed to a velocity increase, this implies that the dynamic pressure of the liquid thereby is increased concurrent with the static pressure of the liquid being decreased correspondingly. If the liquid within another region the flow circuit, for example within said condensing chamber, is exposed to a velocity decrease, the dynamic pressure of the liquid thereby is decreased concurrent with the static pressure of the liquid being increased correspondingly. According to the Bernoulli equation, the dynamic pressure, and thus the static underpressure, of the liquid increases or decreases, proportional to the square of the liquid flow velocity (raised to the 2. power).

In such a flow circuit, where the supplied quantity of gas condensate is not counted in, the liquid flow rate (liquid quantity per unit of time) is constant through the flow sectional area at a random position, for example in a flow sectional area of the venturi section. For two random, but different, positions within the flow circuit, this flow relationship may be expressed by the following equations:

$$q_1 = q_2;$$

where $$q_1 = v_1 \cdot A_1;$$

and $$q_2 = v_2 \cdot A_2;$$

so that $$v_1 \cdot A_1 = v_2 \cdot A_2;$$

or $$v_2 = v_1 \cdot (A_1/A_2);$$

where $q_1$ represents the liquid flow rate (m³/s) at, upstream position 1 within the flow circuit, $v_1$ represents the liquid flow velocity (m/s) at upstream position 1 within the flow circuit, and $A_1$ represents the liquid flow sectional area (m²) at upstream position 1 within the flow circuit; but $q_2$ represents the liquid flow rate (m³/s) at downstream position 2 within the flow circuit, $v_2$ represents the liquid flow velocity (m/s) at downstream position 2 within the flow circuit, and $A_2$ represents the liquid flow sectional area (m²) at downstream position 2 within the flow circuit.

Hence, if $A_2 < A_1$, and thus $(A_1/A_2) > 1$, then $v_2 > v_1$. Also, according to the above-mentioned equations, $v_2$ increases proportionally to $v_1$. Consequently, and provided that $(A_1/A_2) > 1$, the static pressure of the liquid within the venturi section will always be less than the static pressure of the liquid at the upstream inlet of the venturi section.

For instance, if the upstream position 1 is a position at the venturi section inlet, and the downstream position 2 is a random downstream position along the venturi section, the above-mentioned equations may always be expressed as follows:

$$q_{venturi} = q_{inlet};$$

and $$v_{venturi} = v_{inlet} \cdot (A_{inlet}/A_{venturi});$$

where $q_{inlet}$ represents the liquid flow rate (m³/s at the venturi section inlet, $v_{inlet}$ represents the liquid flow velocity (m/s) at the venturi section inlet, and $A_{inlet}$ represents the liquid flow sectional area (m²) at the venturi section inlet; but $q_{venturi}$ represents the liquid flow rate (m³/s) at a given downstream position along the venturi section, $v_{venturi}$ represents the liquid flow velocity (m/s) at a given downstream position along the venturi section, and $A_{venturi}$ represents the liquid flow sectional area (m²) at a given downstream position along the venturi section.

From the equations $$q_{venturi} = q_{inlet}$$

and $$v_{venturi} = v_{inlet} \cdot (A_{inlet}/A_{venturi})$$

where $(A_{inlet}/A_{venturi}) > 1$, it is apparent that the liquid flow velocity, and thus the static underpressure of the liquid, at a given position along the venturi section, may be influenced, however, by adapting the variable parameters $q_{inlet}$, $v_{inlet}$, $A_{inlet}$ and $A_{venturi}$ to the current gas condensing need, and the need may vary as a function of external influencing factors, for example pressure and temperature, properties of the subject gas which is to be condensed, and desired condensing capacity of the gas condenser. By increasing the liquid flow rate $q_{inlet}$, for example by increasing the liquid pumping rate of a possible upstream pump, the liquid flow velocity $v_{venturi}$, and thus the static underpressure of the liquid, is increased at a given position along the venturi section. By so doing, the gas suction capacity of the liquid is increased in this section. On the contrary, for example by maintaining a constant liquid flow rate q, the same increase in the liquid flow velocity $v_{venturi}$ may be achieved by reducing the flow sectional area $A_{venturi}$.

In practice, the highest degree of user flexibility and efficiency of the gas condenser may be achieved when the above-mentioned parameters may be adjusted/controlled. Therefore, the flow circuit of the liquid and/or the gas, upstream and/or downstream of the gas condenser, possibly may be provided with, or designed with, flow-controlling devices, for example one or several pumps, valves and/or constrictions/expansions, in order to achieve an optimum flow characteristic with respect to the current gas condensing need.

Moreover, a liquid pressure loss may arise along the venturi section due to liquid flow turbulence and friction between the flowing liquid and the adjoining walls of the gas chamber and the housing. For instance, such a turbulence may arise in the immediate downstream vicinity of the outlets of the openings, possibly of the nozzles, due to gas, in the shape of gas bubbles, being conducted into the liquid flow, and/or due to possible friction between the flowing liquid and, for example, protruding nozzles of the venturi section. Furthermore, a gas pressure loss may arise when the gas is conducted through the openings, possibly the nozzles. All such static pressure losses reduce the pressure differential between the gas chamber and the venturi section, causing the condensing capacity of the gas condenser to be reduced.

The liquid pressure loss may be restricted in several ways, for example by the surrounding gas chamber and housing walls being smoothly shaped and causing insignificant flow friction, and/or by using nozzles which, by virtue of their design, cause insignificant flow friction, and/or, for example, by placing obliquely into the downstream direction of the liquid the nozzles of the gas chamber wall(s), and/or by placing in the gas chamber wall(s) each opening, possibly nozzle, in such a way that the gas flowing through it influences, to a minimum, the course of flow in potential downstream openings, possibly nozzles, for example by one opening, possibly nozzle, or a row of openings, possibly a row of nozzles, being displaced parallel relative to one or several downstream openings, nozzles, rows of openings or rows of nozzles.

Upon considering the gas condenser shape, size, capacity and flow characteristic, and also the subject gas quantities and gas types to be condensed, the gas pressure loss may be reduced by using, for example, nozzles which cause a minimum of gas flow friction.

Such liquid- and gas pressure losses must be considered when calculating the magnitude of, and the mutual adaptation of, the above-mentioned variable parameters, the inherent purpose being to ensure that the underpressure along the venturi section, upon having considered said pressure losses, is sufficiently large to enable the gas to be driven from the gas chamber and into the flowing liquid.

The gas being sucked into the venturi section of the gas condenser should also be of the type which is readily dissolved in the flowing liquid. An example of a gas which, upon condensing and storing at the correct temperature- and pressure conditions, may become easily dissolved, and remain dissolved, within the associated hydrocarbon liquid after the fluids have been mixed, is a hydrocarbon gas evaporated from a hydrocarbon liquid located in an onshore storage tank or a tanker. Among other things, the ability for the gas to dissolve in the liquid depends on the degree to which the liquid is saturated in the existing gas component (s) which comprise(s) the gas when the gas is mixed into the liquid. At a high degree of liquid saturation, the gas may substantially not become dissolved in the liquid. This may be compensated for by, for example, the gas being exposed to, and dissolved in, an increased liquid flow volume, which presupposes a larger liquid flow rate than the liquid flow rate being required of a liquid possessing a lower degree of saturation. Alternatively, or additionally, the mixture of flowing liquid and gas, the gas existing as gas bubbles in the liquid, may be conducted downstream through, possibly be hurled against, for example a perforated plate or a grate. By so doing, each gas bubble is broken into several smaller gas bubbles that collectively provide a larger surface area than the original gas bubble, thereby increasing the contact surface of the gas bubbles toward the surrounding liquid. Thus, a faster adjustment of thermodynamic equilibrium is achieved, the gas condensing rate thereby increasing. Moreover, and by means of prior art, the gas may possibly be refrigerated before and/or after being conducted into the liquid flow, thereby increasing the condensing capacity of the gas condenser. Furthermore, and by means of prior art, the condensing capacity may be increased by increasing the static pressure of the liquid and/or the gas.

It must be stressed, however, that the above-mentioned methods of increasing the solubility, and thus the condensing rate/condensing capacity of gas in a compatible liquid flow, also may be used for liquids which are less saturated in the existing gas components, the methods preferably being used in combination with a relatively low liquid flow rate. Upon transport of, for example, crude oil in a tanker, in which, for example, a hydrocarbon liquid from the surface layer of the crude oil is used to condense gas in the gas condenser in such a way that the mixture of hydrocarbon liquid and dissolved gas condensate thereafter is conducted to the bottom of the tanker storage tank, the pumping of the mixture into the crude oil at a low liquid flow rate is favourable, a low liquid flow rate causing less agitation of the liquid in the tank, and thereby less evaporation of the most volatile liquid components of the liquid. If the efficient condensing of gas requires a higher liquid flow rate in the gas condenser than the desired liquid flow rate in the tank, the liquid flow exiting the gas condenser possibly may be ramified/branched downstream thereof and be conducted into different positions in the tank.

When the mixture of liquid and gas bubbles continues flowing downstream from the venturi section and into the upper section of the condensing chamber, the flow sectional area is increased in this section, preferably by gradually increasing the sectional area in the downstream direction of the mixture, this expanding flow section hereinafter being denoted as an expansion section. The increase in sectional area in the expansion section causes the mixture flow velocity, and thus the dynamic pressure of the mixture, to decrease, thereby increasing the static pressure of the mixture, cf. the Bernoulli equation of thermodynamic equilibrium. At a static pressure-increase in the expansion section, the static pressure of the mixture will gradually exceed the static pressure of the inflowing gas immediately upstream of the outlet of the openings, possibly the nozzles. Any position in the expansion section, together with positions downstream of the expansion section, being exposed to a higher static pressure than said static pressure of the gas immediately upstream of the outlet of the openings, possibly the nozzles, is/are therefore exposed to a static overpressure relative to this gas pressure. Openings, possibly nozzles, placed in positions along flow sections subjected to static overpressure may cause an undesired effect in that the mixture, due to static overpressure, thus may flow through the openings, possibly nozzles, and into the gas chamber instead of flowing out through the liquid outlet pipe of the condensing chamber.

At said static overpressure, the gas bubbles in the liquid flow may start condensing into gas condensate, so-called bubble condensing, and thereafter dissolving in the liquid. As mentioned, this dissolving effect is further enhanced by conducting, for example, the mixture of gas bubbles and liquid through, possibly by the mixture being hurled against, a perforated plate or a grate, thereby increasing the contact surface of the inflowing gas bubbles toward the surrounding liquid in such a manner that the gas condensing rate increases. The perforated plate or the grate is placed preferably in the expansion section, possibly immediately downstream of this.

An appreciable constructive feature of the gas condenser consists in the openings, possibly the nozzles, in the gas chamber wall(s) being placed in positions along the venturi section, possibly also in positions along the expansion section and preferably in the upstream section thereof, where a static underpressure of the flowing mixture exists, the underpressure being sufficiently large relative to said static gas pressure immediately upstream of the outlets of said openings, possibly nozzles. It is apparent, however, that the openings, possibly the nozzles, largely should be placed in positions which are adapted to the relevant, and possibly varying, operating conditions, and in such a manner that the liquid, during these operating conditions, cannot flow into the gas chamber.

In order for the gas condenser to work satisfactorily at various operating conditions, the gas condenser may be arranged in such a way that the flow parameters of the liquid, possibly the gas, are adjustable, and thus that the condensing capacity of the gas condenser is adjustable. This may most easily be done by the venturi section of the gas condenser, possibly also the downstream expansion section, being arranged with adjustable flow sectional areas. This adjustment possibility may potentially be combined with external adjusting devices or -methods in order to adjust/adapt operational parameters and fluids of the gas condenser, for example by incorporating in the liquid- and/or the gas flow circuits, upstream and/or downstream of the gas condenser, one or several pumping devices, valves, constrictions/ expansions is and/or other necessary equipment, for example one or several refrigerator- and/or compressor devices, in order to adjust/adapt the flow rate, flow velocity, flow sectional area, temperature and/or static pressure of the flowing liquid and/or gas, possibly by using one or several purifier- and/or filtering devices, in order to, for example, separate out undesired components, for example air, air components or other gases, from the flowing fluids.

Viewed in the flow direction of the mixture, the venturi section, and possibly also the expansion section, is/are comprised of successive flow sectional areas which collectively make up the slot volume through which the mixture flows. Either the gas condenser may be formed with a permanently arranged slot volume being adapted optimally to the prevailing operating conditions and -needs. Alternatively, the gas condenser may be arranged to adapt, and thereby vary, the shape of the slot volume in such a way that the slot volume at any time may be adapted optimally to the current operating condition(s) and -need(s). For instance, this may be carried out by adjusting/changing/ adapting, along said section(s), the shape of the slot volume by adjusting/changing/adapting, as desired, the degree of opening/profile of opening of the slot, keeping constant, for example, the volumetric extent of the slot perpendicular to the flow direction and parallel to the walls of the housing and the gas chamber. For instance, and viewed in the downstream direction along the slot, the slot opening, and particularly the venturi section slot opening, may thus gradually decrease or gradually increase, possibly by a combination of these, in such a way that shape of the slot volume, and thereby the flow velocity and static pressure profile of the liquid along said section(s), is adapted optimally to the current operating condition and -need. Alternatively, or in addition to this, the extent of the slot may increase or decrease perpendicular to the flow direction and parallel to the walls of the housing and the gas chamber. By so doing, the slot along said sections may be adjusted/changed/ adapted with, for example, a particular degree of opening, and/or a particular profile of opening, while the extent of the slot in the longitudinal direction may be increased or decreased dependent on the current gas condensing need.

Upon using a gas condenser being arranged to adapt, and thus vary, the shape of the slot volume relative to the gas condensing need at the current operating condition(s), the gas condenser may be arranged in different ways, including:

a) The surrounding housing of the gas condenser and/or the gas chamber of the gas condenser may be arranged, for example, with an adjustable shape along the venturi section, possibly also along the expansion section and/ or at the venturi section inlet opening. In this/these section(s), the walls of the housing and/or the gas chamber may be made of, or provided with, plates or wall sections, possibly flaps, which, for example by means of one or several hinge devices, joints, rails or sliding devices, may be rotated and/or pushed relative to adjacent plates, wall sections and/or flaps. Relative movement between such plates, wall sections and/or flaps increases or decreases the slot opening along the venturi section, the expansion section and/or at the venturi section inlet opening, in such a way that the slot volume along this/these section(s) may be adjusted/ changed/adapted within the constraints of the subject embodiment. This embodiment of the condenser assumes, to the extent necessary, that the rotatable and/or moveable faces, wall sections and/or flaps are joined together by means of pressure-sealed joints, thereby preventing the liquid and/or gas from leaking, and/or from introducing into the gas condenser an undesired pressure profile. Such a gas condenser, however, is shown in the following embodiments.

b) Alternatively, or as an addition to the above-mentioned embodiment, the gas chamber, possibly the housing, may be arranged in such a way that it may be elevated or lowered relative to the co-operating and stationary component (the housing or the gas chamber), thereby increasing or decreasing the slot volume along the flow section of interest.

c) In a further example, or addition, the gas chamber wall(s) may be arranged with an adjustable number of openings, possibly nozzles, which, as required, are made available for the flow-through of gas, for example by pushing a moveable plate or a moveable lid over the openings, possibly the nozzles, by means of a suitable actuator device, thereby stopping or limiting the flow of gas through these. Viewed both along and perpendicular to the flow direction of the liquid, the openings, possibly the nozzles, may also be placed in one or several rows or patterns along the gas chamber wall(s).

In order to rotate/push the rotatable/moveable plates, wall sections and/or flaps relative to adjacent plates or wall sections; or in order to elevate or lower the gas chamber, possibly the housing, relative to the co-operating and stationary component (the housing or the gas chamber); or possibly in order to push a plate or a lid over the openings, possibly the nozzles, the moveable plate(s), wall section(s), flap(s) and also moveable plate(s) or lid(s) must be arranged with a suitable actuator device which provides the relative movement. Such a actuator device may consist of a hydraulic cylinder, an electric motor and/or a mechanical device. The actuator device(s) is/are preferably arranged to be activated and controlled by means of remote control, and preferably together with equipment which, for example, registers the flow parameters of the gas condenser and also monitors, controls and runs any other devices/appliances, for example a pumping device, and other equipment required in this context.

Moreover, the housing, the gas chamber, and also plates, flaps, lids and similar equipment which the gas condenser is equipped with, may be given different geometric shapes, the pertinent shape largely being related to the current quantities of gas and gas condensing need at the user place. Preferably, the gas condenser according to the invention aims at providing a condensing device arranged to condense relatively large quantities of gas and preferably, but not necessary, by using a relatively low liquid flow rate.

For instance, and viewed in a vertical section perpendicular to the longitudinal direction of the gas condenser, preferably the housing may be formed wholly or partially as a container which, in its operational position, is of a rectangular or a square shape in a lower section, or bottom section, while the upper section, or the top section, may be comprised of inclined walls which converge upward in a point/tip, as the bottom section and the top section of the housing may be comprised of longitudinally extended plates running in the longitudinal, and preferably in the horizontal, direction of the gas condenser, cf. embodiments mentioned below. Furnished with such a shape, the housing must be provided with end walls, the walls of the bottom section and the top section thereby forming an inner open volume together with the end walls. Furthermore, and viewed in corresponding vertical section, the associated gas chamber is comprised of longitudinal and inclined walls which converge upward in a point/tip, the inclined walls, to the degree intended, being shaped more or less complementary relative to the inclined walls of the surrounding housing. Viewed in the longitudinal direction of the gas condenser, the openings between the upper sections of the housing and gas chamber walls, when assembled, thus may comprise two longitudinal venturi sections, one venturi section of which being placed on either side of the top section. Any intended deviations in the complementary shapes of the housing and the gas chamber may constitute the desired changes in, the flow sectional areas of each venturi section. Viewed in the same vertical section, a central section of the gas chamber, however, may be formed of vertical side walls, and also of possible downward inclined and converging side walls in a bottom section. By so doing, the openings between the housing side walls and the side walls of the central and bottom sections of the gas chamber may constitute two longitudinal expansion sections extending in the longitudinal direction of the gas condenser, one expansion section of which being placed on either side of the gas chamber. In order to further facilitate the condensing of the gas, and also in order to collect the condensate/liquid mixture before being conducted out of the gas condenser through one or several liquid outlet pipes, the bottom section of the housing, however, may be provided with a condensing chamber. Referring to the embodiments mentioned below, this geometric shape (embodiment) of a gas condenser according to the invention is flexible and may easily be arranged to condense relatively large and varying quantities of gas, simultaneously using a relatively low liquid flow rate.

In another embodiment, the upper section of both the housing and the gas chamber may be given a circular cone shape, and the lower section of the gas chamber may be given a circular cone shape of opposite direction, while the lower section of the housing may be cylindrical. Resembling the preceding embodiment, the upper section of the housing and the gas chamber also may be shaped into a point/tip which, to the degree intended, is shaped more or less complementary relative to the shape of the surrounding housing, and any intended deviations in the complementary shapes of the housing and the gas chamber constitute desired changes in the flow sectional areas of the venturi section. Likewise, the opening between the lower sections of the housing and the gas chamber may constitute the expansion section of the gas condenser. Viewed in horizontal section, this geometric shape of a gas condenser according to the invention is arranged with only one circular venturi section and expansion section and thus is less flexible than the preceding embodiment, this embodiment being arranged to preferably condense smaller quantities of gas, and also being arranged to handle smaller variations in the supplied quantity of gas.

In a further embodiment, both the surrounding housing and the gas chamber is comprised or cylindrical and/or conical pipes, as the inner pipe (the gas chamber) and/or the surrounding pipe (the housing), to the degree intended, may be arranged with varying pipe diameters, thereby forming both a venturi section and an expansion section through which liquid and gas may flow in the above-mentioned manner. Viewed in horizontal section, and resembling the preceding embodiment, this geometric shape of a gas condenser according to the invention is arranged with only one circular venturi section and one expansion section and thus is less flexible than the first-mentioned embodiment, the last-mentioned embodiment being arranged to preferably condense smaller quantities of gas, and also being arranged to handle smaller variations in the supplied quantity of gas.

After having completed the gas condensing, the mixture of dissolved gas (condensate) and volatile liquid is conducted out of the gas condenser through one or several liquid outlet pipes and back to, for example, a storage tank, preferably to the bottom layer of the liquid in the storage tank, wherein the largest hydrostatic pressure prevails, causing largely, among other things, the gas condensate to remain dissolved in the liquid. Alternatively, in a flow position upstream and/or downstream of the gas condenser, the mixture, possibly the gas, may undergo a pre- and/or after-treatment in which potential other gases, being minutely-soluble or non-soluble in the liquid, for example air, nitrogen and/or $CO_2$, may be removed by means of prior art, per se, not being comprised by this invention. In addition, the inside of the gas condenser may be provided with ribs/fins, plates or flaps which cause a favourable, for example a pressure loss reducing, course of flow in the mixture, the mixture, and possible branch flows thereof, thereby being conducted into one or several liquid outlet pipes. Moreover, the liquid outlet pipe(s), and/or possible other sections of the flow circuit, may be provided with pressure-regulating devices, for example valves and/or constrictions to be used, for example, to maintain a certain counterpressure between the gas condenser and the storage tank.

Advantages Achieved by the Invention

By means of the subject gas condenser, a technical solution for condensing gas/vapour, preferably a hydrocarbon gas, evaporating from volatile liquids, preferably a hydrocarbon liquid such as crude oil, diesel and petrol, is provided, the gas condenser being arranged to enable simple and efficient condensing of larger volumes of such gases/vapours.

Thereby, effluents/discharges of such evaporation gases may be avoided, possibly be reduced substantially, and thus avoiding, possibly reducing substantially, potential harmful effects on the surrounding environment.

Moreover, such gases often are inflammable and explosive, and minor or no discharges therefore represent a safety advantage.

Furthermore, such gases are normally of economical and industrial value, and avoiding such discharges is therefore desired, which the gas condenser wholly or partially contribute to.

Another advantage of the invention is that the gas condenser may be arranged, by means of one or several adjusting devices, to adjust/change/adapt the condensing capacity relative to the current condensing need, the need increasing/decreasing relative to increasing/decreasing evaporation and/or displacement of such a gas/vapour.

Besides, the gas condenser is arranged in such a way that a possible adjusting device may be placed in, or arranged to, the gas condenser without the adjusting device, by virtue of its physical design and/or position in the gas condenser, negatively influencing, for example in the form of pressure loss related to turbulence or flow friction, the course of liquid flow upstream of, and through, the gas condenser. For instance, an adjusting stay/bar connected to the upper section of the gas chamber in order to elevate/lower the gas chamber may cause undesired liquid pressure loss in the form of increased flow friction and turbulence, the stay/bar being placed in the liquid supply pipe/-conduit of the gas condenser.

Advantageously, the gas condenser may be used in connection with, but not limited to, storage, transport, loading and unloading of, for example, crude oil or crude oil product in liquid state, and such a liquid may exist, for example, in a stationary onshore-based storage tank or in a mobile storage tank on a ship or a vehicle.

BRIEF DESCRIPTION OF THE DRAWINGS

In the following section of the description, referring to FIGS. 1–7, two non-limiting embodiments of the gas condenser will be shown, one particular reference numeral referring to the same detail in all drawings in which the detail is shown, where:

FIG. 4 shows, similar to FIG. 2, a corresponding centrally located vertical section through the gas condenser as viewed along vertical section line IV—IV, cf. FIG. 6 and FIG. 7, the gas condenser, however, additionally being provided with two flaps, one flap of which on either side of the longitudinal axis of the gas condenser, the gas chamber of the gas condenser being shown in an elevated position, thereby placing the flaps in a vertical position, and the liquid (shown with downstream directed arrows) is flowing past two venturi sections and two venturi section extensions located downstream thereof, FIG. 4 also showing vertical section line VI—VI, cf. FIG. 6, and horizontal section line VII—VII, cf. FIG. 7;

FIG. 5 shows, similar to FIG. 4, a corresponding centrally located vertical section through the gas condenser as viewed along vertical section line IV—IV, cf. FIG. 6 and FIG. 7, and the gas condenser being provided with two flaps, the gas chamber, however, being shown in a lowered position, the flaps thereby pointing down and out from the gas chamber, and the liquid (shown with downstream directed arrows) is flowing past two venturi sections and two venturi section extensions located downstream thereof;

FIG. 6 shows a longitudinal vertical section through the gas condenser as viewed along vertical section line VI—VI, cf. FIG. 4, and shows five of a total of ten horizontal rows of nozzles being placed in the gas chamber walls, the gas chamber being arranged with two hydraulic cylinders in order to elevate/lower the gas chamber, the drawing showing the gas chamber in an elevated position, FIG. 6 also showing vertical section line IV—IV, cf. FIG. 4, and horizontal section line VII—VII, cf. FIG. 7; and FIG. 7 shows a horizontal section viewed along horizontal section line VII—VII, cf. FIG. 4 and FIG. 6, wherein the drawing shows two grates placed horizontally in the gas chamber, the grates being used in order to break up the gas bubbles into a larger amount of smaller gas bubbles, and also a gas supply pipe and a liquid supply pipe, FIG. 7 also showing vertical section line VI—VI, cf. FIG. 6.

However, all drawings are schematic and may be somewhat distorted with respect to sizes and lengths.

DESCRIPTION OF EMBODIMENTS OF THE INVENTION

Equipment, devices, appliances and/or arrangements which do not concern the invention itself, but which otherwise are, or may be, necessary premises to enable the practicing of the invention, are not stated any further or described in detail in the following embodiments. Preferably, such equipment etc. is/are associated with a flow circuit between a storage tank not shown on the drawings and a gas condenser 2 according to the invention. A gas 4 and a liquid 6 compatible with the gas 4 flow from the storage tank not shown, the storage tank being arranged with, for example, pumping device not shown and also possible valves and/or constrictions/expansions which, preferably, are used to adjust/regulate, in upstream/downstream position(s) of the gas condenser 2, the flow rate, flow velocity, flow sectional area and/or static fluid pressure of the liquid 6, possibly also of the gas 4, flowing through the gas condenser 2. For instance, equipment used to register flow parameters in the gas condenser 2 and/or the remaining part of the flow circuit, and also equipment used to monitor, control and drive these, and possibly other appliances or devices, for example one or several pumping devices, refrigeration- and/or compressor devices, possible purifier- and/or filtering devices used to, for example, separate undesired components, for example air, air components or other gases, from the flowing fluids, are also not stated any further or described in detail in the following embodiments.

The gas 4 is conducted from the storage tank through a gas supply pipe 8 onward to and into a lower section of the gas condenser 2. Inside the gas condenser 2, the lower end section of the gas supply pipe 8 is provided with an interior telescopically moveable extension pipe 10 which, by means of suitable and pressure-sealing gaskets 12, is moveably connected to the gas supply pipe 8. The upper section of the extension pipe 10 is connectably arranged to a downward-convex bottom section 14 of a, in plan view, rectangularly shaped and longitudinally extended gas chamber 16, the gas 4 being conducted into an opening in the gas chamber 16 via a the extension pipe 10. In vertical view, cf. for example FIG. 2 and FIG. 3, a central section 18 of the gas chamber 16 is comprised of vertical side walls 20 and 22, and, an upper section 24, of inclined walls 26 and 28 which converge upward in a tip 30, and of two end walls 32 and 34 each being placed at an end section of the longitudinally extended gas chamber 16.

Figure 6:
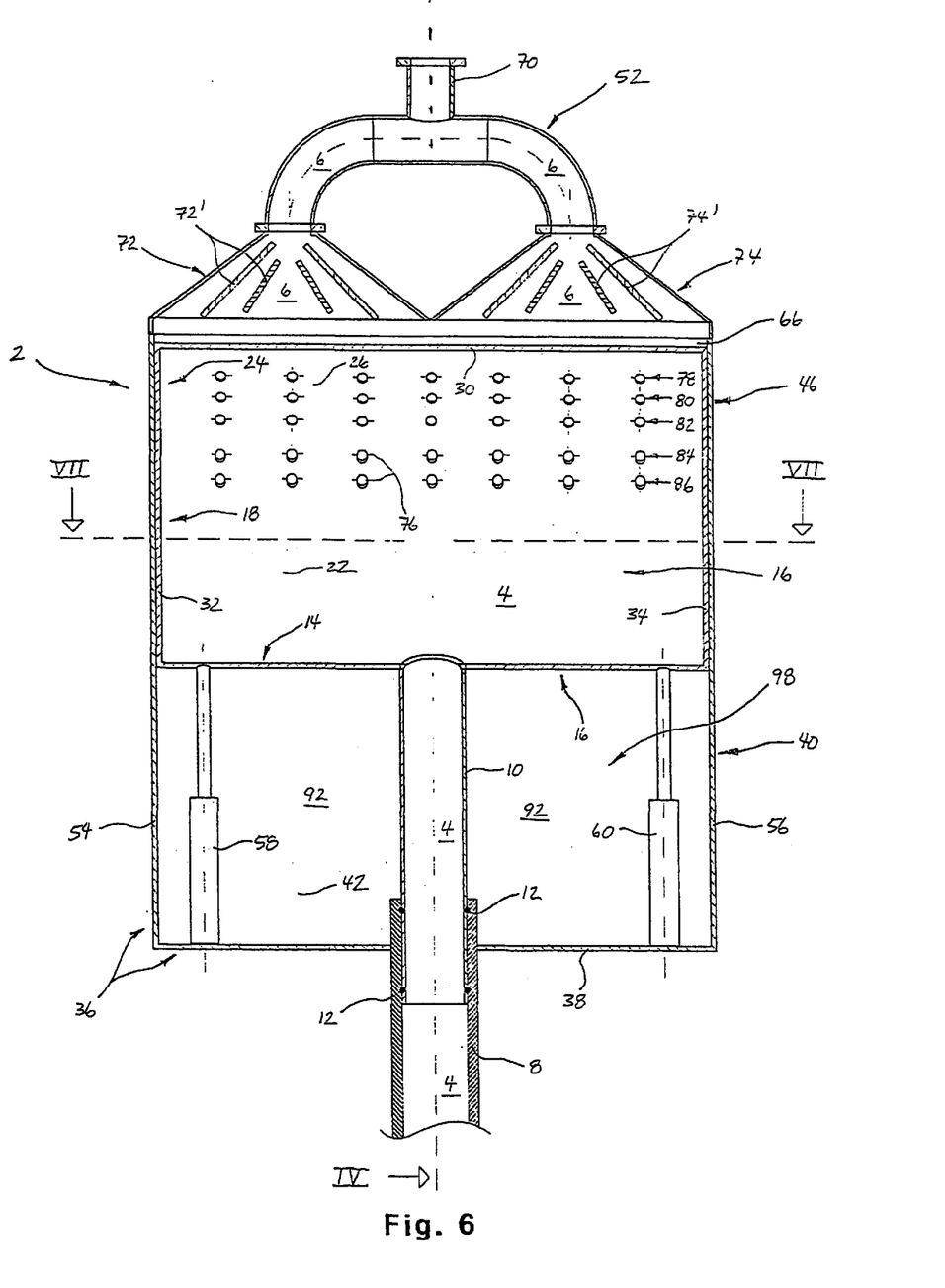
Figure 7:
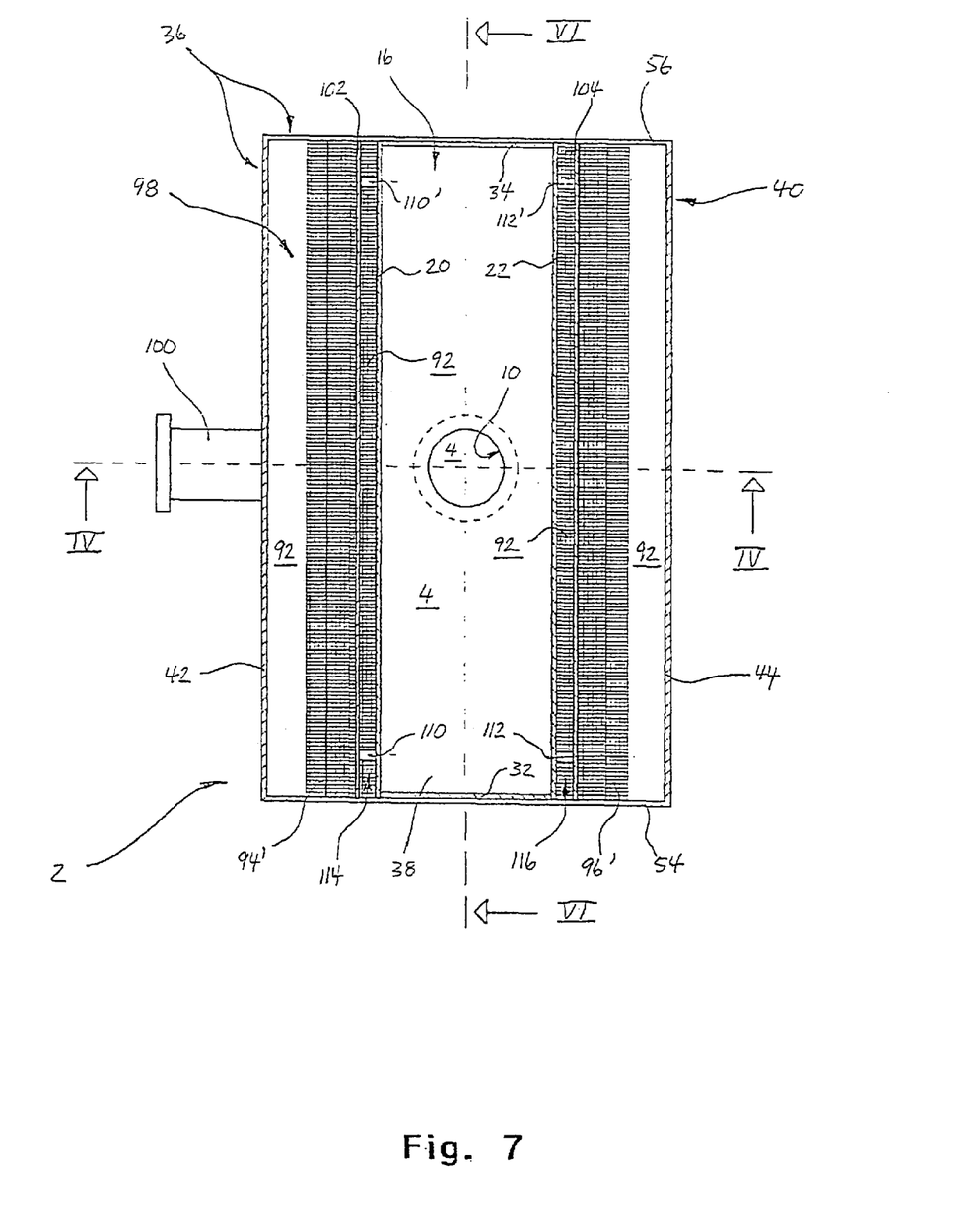

The gas chamber 16 is surrounded by, in plan view, cf. FIG. 7, a rectangularly shaped and longitudinally extended housing 36, wherein the chamber 16 is centrally placed. In vertical view, cf. FIG. 2 and FIG. 3, the housing 36 is comprised of a bottom plate 38, and, in a lower section 40, of vertical side walls 42 and 44, and, in an upper section 46, of inclined walls 48 and 50 which converge upward against a liquid supply manifold 52, and also of two end walls 54 and 56 each being placed at an end section of the longitudinally extended housing 36. Moreover, in both embodiments, and on either side of the extension pipe 10, the gas chamber 16 is arranged with two vertical and co-operating hydraulic cylinders 58 and 60, the upper section of each cylinder 58 and 60 being connected to the bottom section 14 of the gas chamber 16, while the lower section of each cylinder 58 and 60 is connected to the bottom plate 38 of the surrounding housing 36, cf. FIG. 6. By means of the co-operating hydraulic cylinders 58 and 60, the gas chamber 16 may be elevated (elevated position) or lowered (lowered position) relative to the surrounding housing 36.

In both embodiments, the inclined wall 26 of the gas chamber 16 is placed parallel to, but in distance from, the inclined wall 48 of the housing 36, and the inclined wall 28 of the gas chamber 16 is placed parallel to, but in distance from, the inclined wall 50 of the housing 36. Between the upper section 24 of the gas chamber 16 and the upper section 46 of the housing 36, two longitudinal slots thereby appear, one slot of which being located on either side of the longitudinal central axis of the gas condenser 2, the slots hereinafter being denoted as a venturi section 62 and a venturi section 64. In the upstream and upper sections, the venturi sections 62 and 64 are provided with their own inlet opening 66 and 68, through which the liquid 6 may flow.

Concurrent with the gas 4 being conducted into the gas chamber 16 at a static pressure higher than the static pressure of the gas 4 in the gas chamber 16, the liquid 6 is conducted through a liquid supply pipe 70 and onward to and through the liquid supply manifold 52. In these embodiments, the liquid supply manifold 52 is provided with two manifold chambers 72 and 74, the interior of each manifold chamber 72 and 74 being provided with several liquid distribution fins 72' and liquid distribution fins 74', respectively, which distribute the liquid 6 evenly in the longitudinal direction of the gas condenser 2, cf. FIG. 6.

Then, the evenly distributed liquid flow is conducted in the downstream direction into inlet openings 66 and 68, after which the liquid 6 flows onward through the venturi sections 62 and 64. The venturi sections 62 and 64 are arranged with smaller flow sectional areas than those of flow sectional areas, for example the flow sectional areas at the inlet openings 66 and 68, positioned upstream thereof, the liquid 6 thus flowing in the venturi section 62 and 64 with an increased velocity, but with a lower static pressure, than at the inlet openings 66 and 68. This static pressure is less than the static pressure of the gas 4 in the gas chamber 16, providing thus a static underpressure in the venturi section 62 and 64. In the gas condenser 2, this underpressure is utilised by providing the inclined wall 26 and 28 of the gas chamber 16, possibly also an upper section the vertical side walls 20 and 22 of the gas chamber 16, with through-going nozzles 76, through which the gas 4 may flow into, and be conducted onwards by means of, the liquid 6. In the embodiments, the nozzles 76 are placed in horizontal rows of nozzles along the gas chamber 16. In the first embodiment, cf. FIG. 2 and FIG. 3, and along the inclined wall 26, three horizontal rows of nozzles 78, 80 and 82 are placed together with three corresponding horizontal rows of nozzles 78', 80' and 82' positioned along the inclined wall 28. However, in the second embodiment, cf. FIG. 1 and FIGS. 4–7, an upper section of each of the vertical side walls 20 and 22 of the gas chamber 16 is provided with two horizontal rows of nozzles 84 and 86, together with 84' and 86'. In both embodiments, all nozzles 76 are placed obliquely into the downstream direction of the liquid 6, thereby reducing turbulent flow in the liquid flow.

Figure 1:
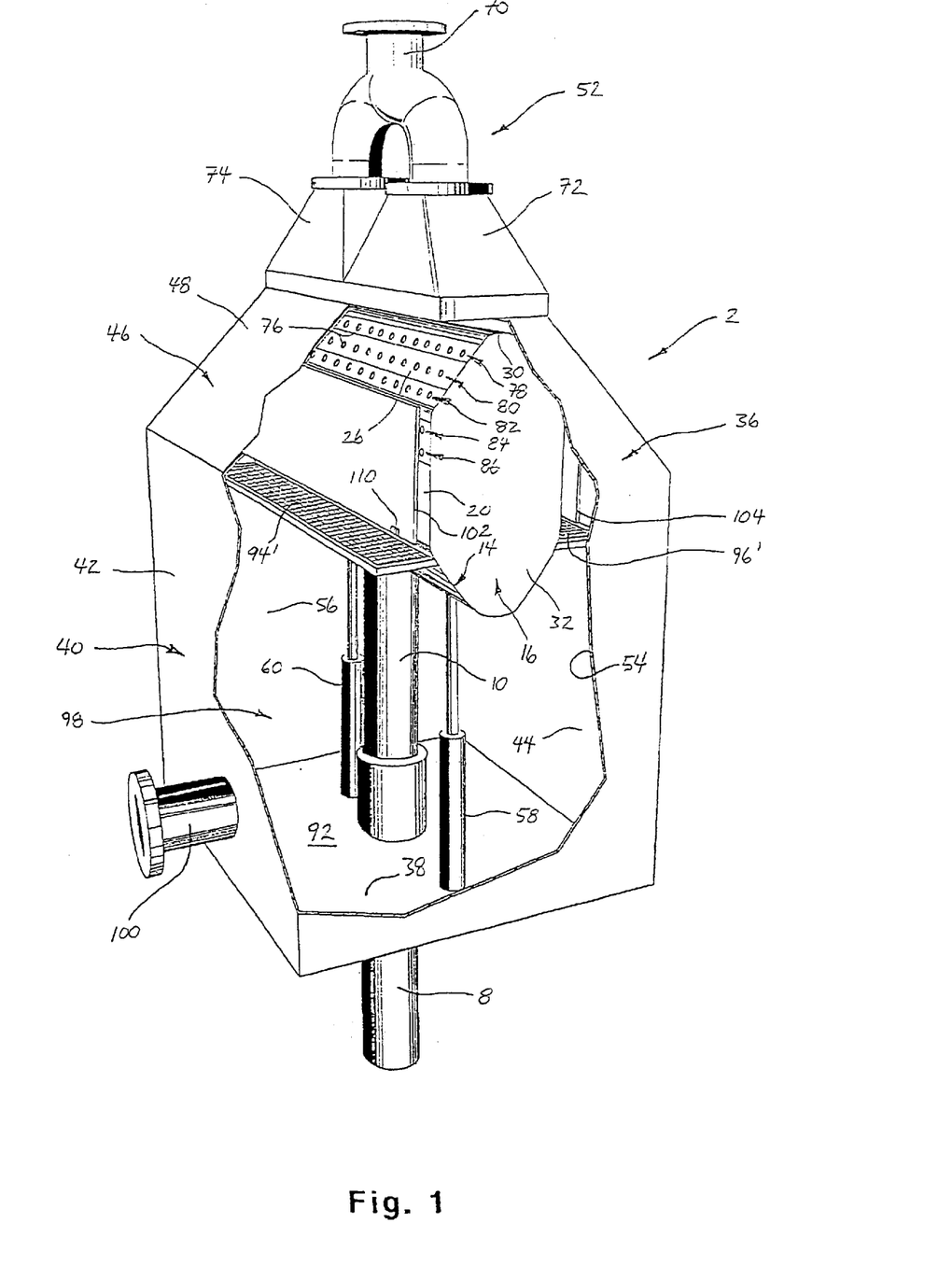
FIG. 1 shows, in perspective, a view of a gas condenser according to the invention, the drawing being shown with a part section of the gas condenser housing in such a way that the inner components of the gas condenser are illustrated, including two flaps, two grates, two hydraulic cylinders, one gas supply pipe and one centrally located gas chamber provided with nozzles, the housing being provided with a liquid supply pipe, a liquid supply manifold and a liquid outlet pipe.
Figure 2:
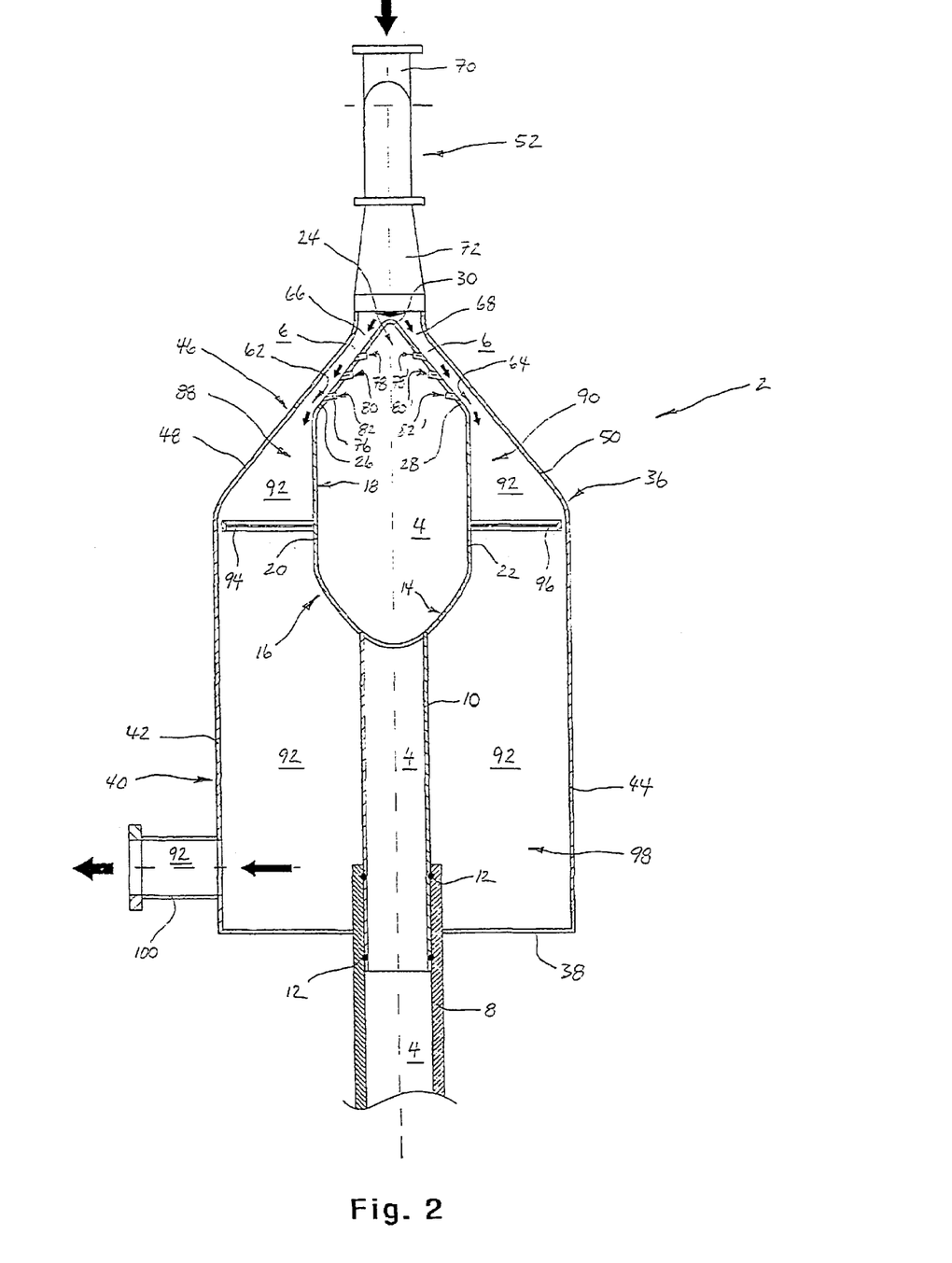
FIG. 2 shows a centrally located vertical section through the gas condenser, the section being located perpendicular to the longitudinal direction of the gas condenser, the gas condenser being shown in an elevated position whilst a liquid (shown with downstream directed arrows) is flowing past two venturi sections and two expansion sections located downstream thereof.
Figure 3:
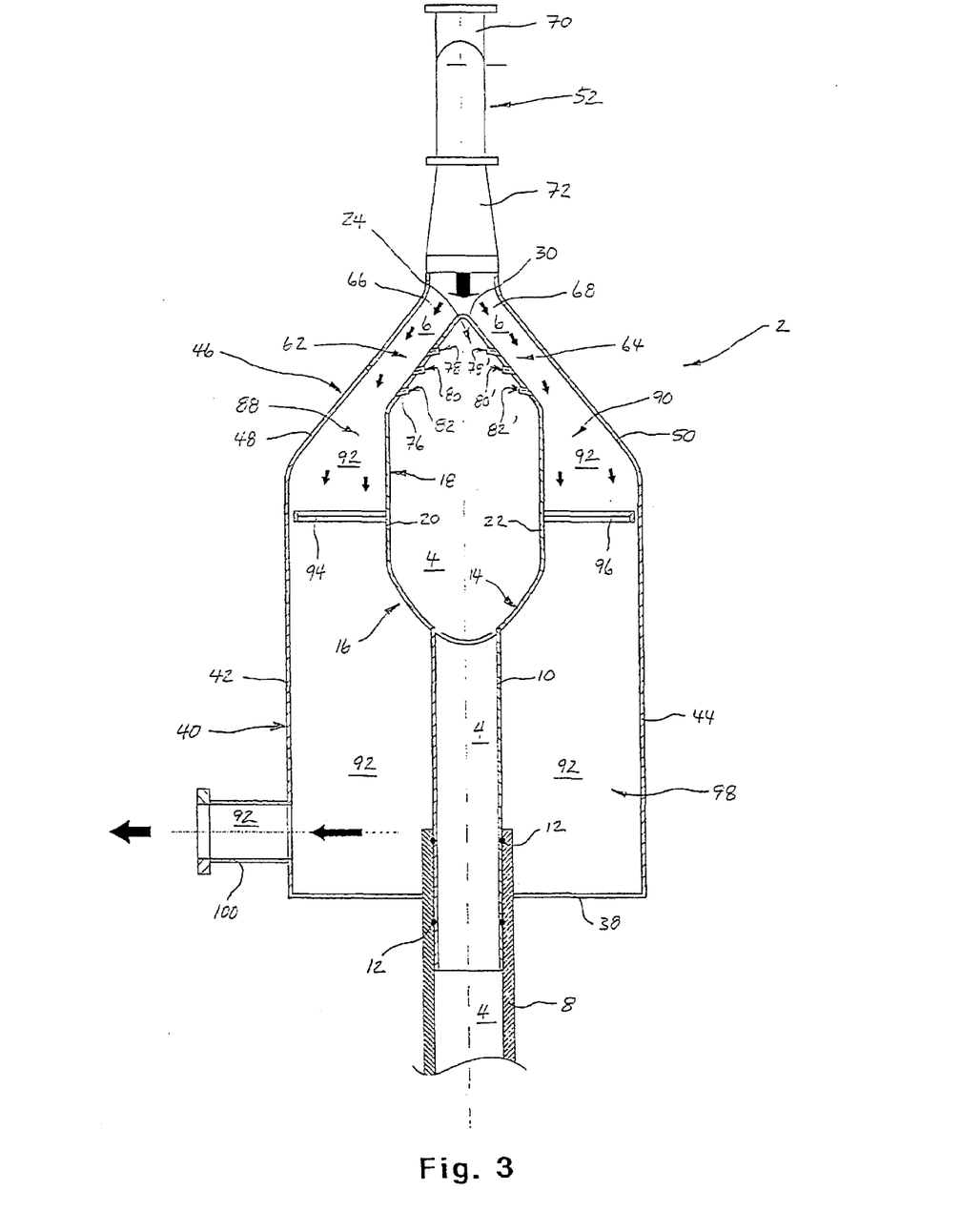
FIG. 3 shows, similar to FIG. 2, the same centrally located vertical section through the gas condenser, the gas condenser, however, being shown in a lowered position whilst the liquid (shown with downstream directed arrows) is flowing past two venturi sections and two expansion sections located downstream thereof.
Figure 4:
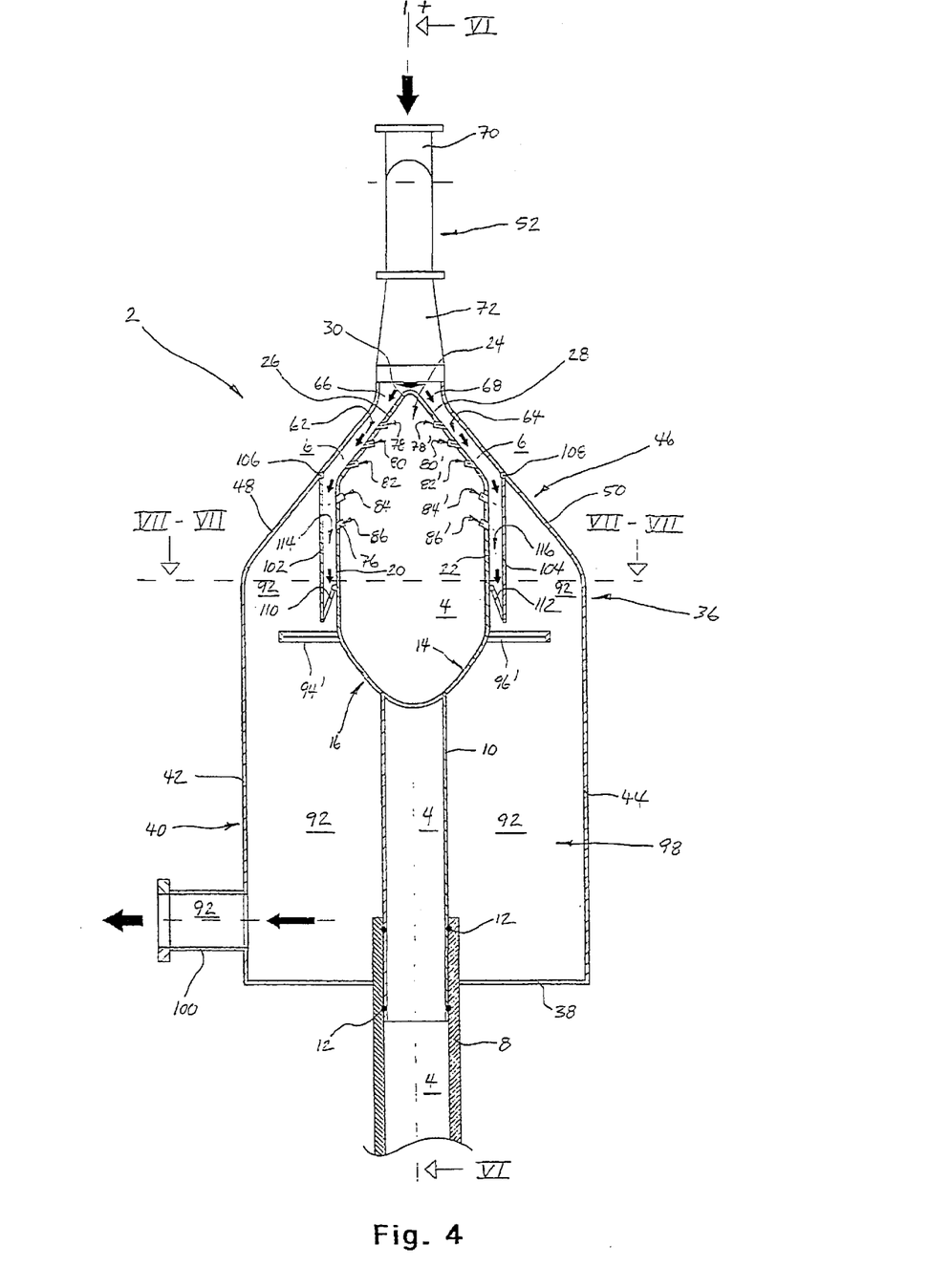

Moreover, in the first embodiment, cf. FIG. 2 and FIG. 3, the vertical side walls 20 and 22 of the gas chamber 16 are positioned at a distance from a lower section of the inclined walls 48 and 50 of the housing 36, and also from an upper section of the vertical side walls 42 and 44 of the housing 36, thereby causing two longitudinal expansion sections 88 and 90 to appear, one expansion section 88 or 90 of which positioned on either side of the longitudinal central axis of the gas condenser 2, and the flow sectional areas of the expansion sections 88 and 90 increasing in the downstream direction. When a mixture 92 consisting of the gas 4, in the form of gas bubbles, and the liquid 6 flows through the expansion sections 88 and 90, the mixture 92 will flow with a gradually decreasing flow velocity, and thus a gradually increasing static pressure, the gas bubbles thereby gradually starting to condense and dissolve in the liquid 6. In order to increase the contact surface of the gas bubbles toward the surrounding liquid 6, and thereby increasing the gas condensing rate, the mixture 92 is conducted through two grates 94 and 96, the grates 94 and 96 being arranged to the gas chamber 16, and one grate 94 or 96 being placed in each expansion section 88 or 90, the expansion sections 88 and 90 comprising upper sections of a condensing chamber 98. Subsequently, the mixture 92 flows onward into the lower section of the condensing chamber 98, this lower section being comprised of the volume between the bottom plate 38 of the housing 36 and the expansion sections 88 and 90. In this lower section, the mixture 92 is thereafter conducted out through a liquid outlet pipe 100 and back to the storage tank. When, by means of the hydraulic cylinders 58 and 60, the gas chamber 16 is elevated, thus bringing the gas chamber 16 closer to the surrounding housing 36, the flow sectional areas along the venturi sections 62 and 64 will decrease. By so doing, the flow velocity of the liquid 6 will increase and the static pressure will decrease, thus increasing the flow rate of the gas 4 from the gas chamber 16. On the other hand, when the gas chamber 16 is lowered, but at the same liquid flow rate, the flow sectional areas along the venturi sections 62 and 64 will increase. By so doing, the flow velocity of the liquid 6 will decrease and the static pressure will increase, thus decreasing the flow rate of the gas 4 from the gas chamber 16. At these courses of flow, the flow rate of the liquid 6 through the venturi sections 62 and 64 is constant. If, however, the flow rate of the liquid 6 is increased, the flow rate of the gas 4 from the gas chamber 16 will also increase in such a way that larger quantities of gas may be condensed in the gas condenser 2. However, at this new liquid flow rate, and in a corresponding way, it is still possible to elevate or lower the gas chamber 16.

Moreover, in the second embodiment, cf. FIG. 1 and FIGS. 4–7, the gas condenser 2 is arranged as described in the first embodiment. The inclined walls 48 and 50 of the housing 36, however, are furthermore provided each with a flap 102 or 104, the upper section of each flap 102 and 104 being rotatably arranged each to their own inclined wall 48 or 50 by means of each their own hinge devices 106 and 108. The hinge devices 106 and 108 are connected to the housing 36 vis-à-vis the transition section between the inclined wall 26 of the gas chamber 16 and the vertical side wall 20, and also between the inclined wall 28 and the vertical side wall 22, cf. FIG. 4 and FIG. 5. Simultaneously, and by means of pressure-sealing connections, the upper section of each flap 102 and 104 is placed against its own inclined wall 48 or 50, thus conducting only the mixture 92 between the gas chamber 16 and the flaps 102 and 104. Furthermore, either side of the lower section of the flap 102 is provided with stays 110 and 110', while the flap 104 correspondingly is provided with stays 112 and 112', cf. FIG. 7. The stays 110 and 110' are, in one end section, rotatably arranged to the flap 102 and, in the other end section, rotatably arranged to the vertical wall 20 of the gas chamber 16, while the stays 112 and 112' are correspondingly and rotatably arranged to the flap 104 and the vertical side wall 22 of the gas chamber 16. As opposed to the first embodiment, the gas condenser of this embodiment is provided with two smaller grates 94' and 96', the grates 94' and 96' being arranged to the gas chamber 16 on the downstream side of the flaps 102 and 104.

In the elevated position, in which position the stays 110 and 110', and also the stays 112 and 112', point down and obliquely out from the gas chamber 16, the flaps 102 and 104 are placed in a vertical or a near-vertical position. In practice, the slots between the gas chamber 16 and the flaps 102 and 104 thus comprise downstream extensions of the venturi sections 62 and 64, or venturi extensions 114 and 116, thus keeping constant the flow sectional areas thereof. For this reason, two horizontal rows of nozzles 84 and 86, and also 84' and 86', have been placed in upstream sections of the venturi extensions 114 and 116, cf. FIG. 4.

Figure 5:
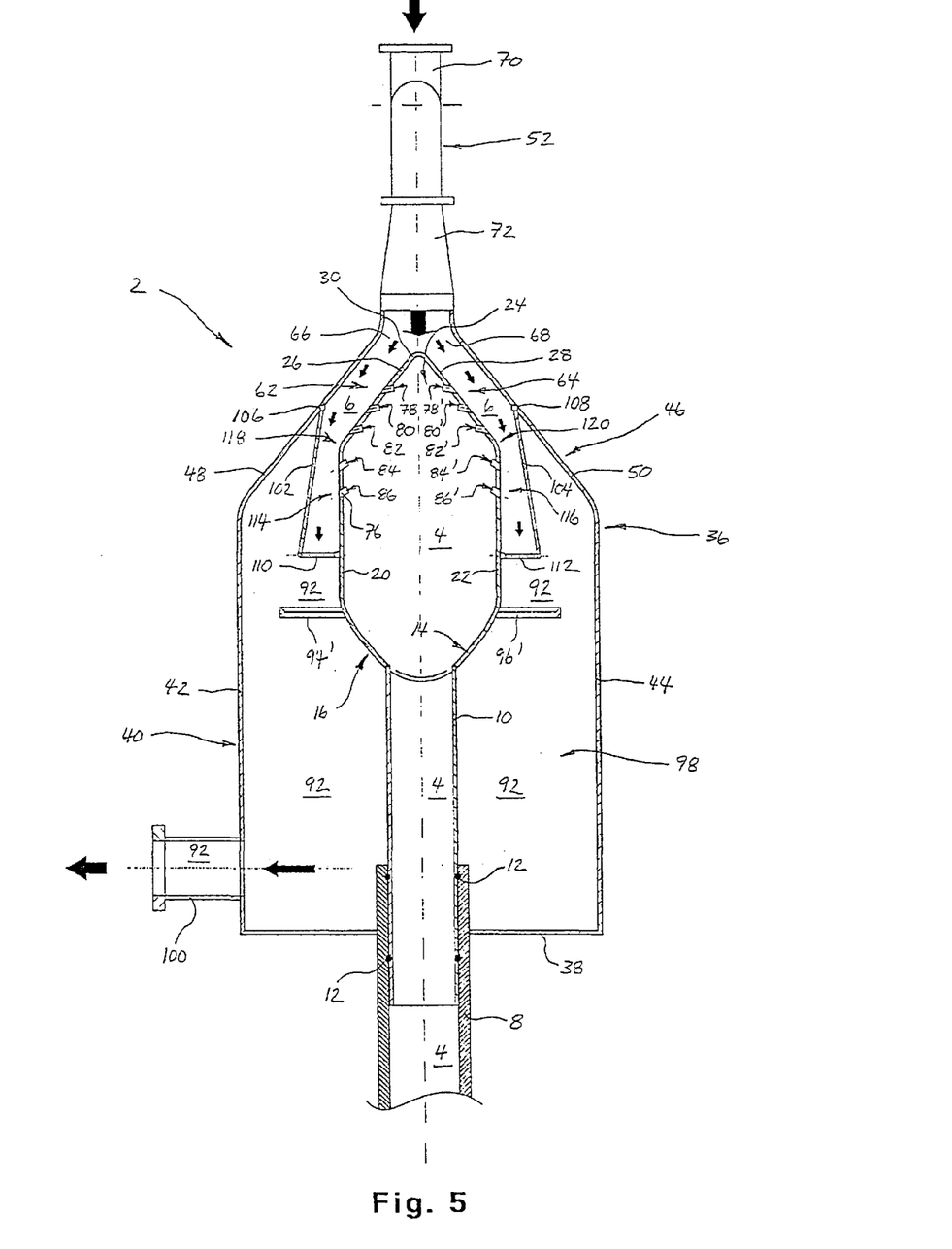

In the lowered position, in which position the stays 110 and 110', and also the stays 112 and 112', point horizontally or near-horizontally out from the gas chamber 16, the flaps 102 and 104 will point down and obliquely out relative to a vertical position, the distance between the gas chamber 16 and the flaps 102 and 104 thus increasing in the downstream direction. In this embodiment, this causes the flow sectional areas along the venturi sections 62 and 64, and also along the venturi extensions 114 and 116, to vary, FIG. 5 showing a constricted section 118 between the venturi section 62 and the venturi extension 114, and also a constricted section 120 between the venturi section 64 and the venturi extension 116. Upon, in a non-disclosed embodiment, when the gas chamber is placed in the lowered position, seeking to maintain a constant flow sectional area in the venturi sections 62 and 64, and simultaneously seeking to increase the flow sectional area in the downstream direction along the venturi extensions 114 and 116, said hinge devices 106 and 108 may be moveably arranged to inclined walls 48 and 50 of the housing 36 by means of rails or sliding devices, thereby enabling the flaps 102 and 104, in addition to being rotatable, to be pushed along the inclined walls 48 and 50 by means of, for example, an actuator. If desired, forming constricted section 118 and 120 may thus be avoided.

By adapting/changing the length of the stays 110 and 112, and/or by placing the stays 110 and 110', and also the stays 112 and 112', in a different vertical position along the central section 18 of the gas chamber 16, it is obvious, however, that by using flaps 102 and 104, the flow sectional areas along the venturi extensions 114 and 116 may be further adjusted, thus further adapting the courses of flow and pressure of the mixture 92 through the gas condenser 2.

What is claimed is:

1. A gas condenser (2) for condensing a gas (4) derived from a volatile liquid, the gas condenser (2) being connected to a flow circuit conveying said gas (4) and a gas-compatible liquid (6) to the gas condenser (2), the gas condenser comprising:

at least one gas supply conduit (8) for conveying said gas (4);

a gas chamber (16) connected to said gas supply conduit (8), said gas chamber (16) having at least one wall (20, 22, 26, 28) formed with at least one aperture therethrough for emitting said gas (4);

at least one liquid supply conduit (70) for conveying said gas-compatible liquid (6);

a housing (36) surrounding said gas chamber (16), said housing (36) being connected to said liquid supply conduit (70) for receiving said liquid (6);

a condensing chamber (98) in said housing (36) in which said gas (4) is condenses and mixed with said gas-compatible liquid (6) to for a mixture (92);

at least one flow channel formed between said housing (36) and said gas chamber (16), and extending from said liquid supply conduit (70) to said condensing chamber (98), said at least one aperture through said at least one gas chamber wall (20, 22, 26, 28) opening into said at least one channel, said channel having an upstream inlet opening (66, 68) connects to said liquid supply conduit (70); and a downstream venturi section (62, 64) having a constricted cross sectional area causing an underpressure to form in response to throughput of said liquid (6), said underpressure being sufficient to drive said gas (4) from said gas chamber (16) into said liquid (6), after which channel conveys said resultant mixture (92) of gas (4) and liquid (6) to said condensing chamber (98; and at least one liquid outlet pipe (100) connected to said condensing chamber (98), said liquid outlet pipe (100) conveying said mixture (92) from said condensing chamber (98).

2. The gas condenser (2) of claim 1, wherein said gas chamber (16) is located centrally within said gas condenser (2).

3. The gas condenser (2) of claim 1, further comprising a liquid supply manifold (52) for receiving said liquid (6) from said liquid supply conduit (70) and distributing the liquid (6) to said inlet opening (66, 68) of said flow channel.

4. The gas condenser (2) of claim 1, wherein said gas chamber (16) is provided with a plurality of said apertures.

5. The gas condenser (2) of claim 4, wherein said apertures are formed in at least one row.

6. The gas condenser (2) of claim 4, wherein said apertures are provided with nozzles (76) for conveying said gas (4).

7. The gas condenser (2) of claim 1, wherein said at least one aperture is facing into said venturi section (62, 64).

8. The gas condenser (2) of claim 7, wherein said at least one aperture is provided with a nozzle (76) for conveying said gas (4).

9. The gas condenser (2) of claim 8, wherein said nozzle (76) is placed at an oblique angle and aimed in a downstream direction within said venturi section (62, 64).

10. The gas condenser (2) of claim 1, wherein an expansion section (88, 90) is located between said venturi section (62, 64) and said condensing chamber (98) to form an upper section of said condensing chamber (98), said expansion section (88, 90) increasing its cross sectional area in a downstream flow direction.

11. The gas condenser (2) of claim 10, wherein said at least one aperture is facing into said expansion section (88, 90).

12. The gas condenser (2) of claim 11, wherein said at least one aperture is provided with a nozzle (76) for conveying said gas (4).

13. The gas condenser (2) of claim 12, wherein said nozzle (76) is placed at an oblique angle and aimed in a downstream direction within said expansion section (88, 90).

14. The gas condenser (2) of claim 1, further comprising at least one means for adjusting said cross sectional area of said venturi section (62, 64).

15. The gas condenser (2) of claim 14, wherein said adjusting means comprises at least one plate device being moveable relative to walls of said venturi section (62, 64), said movable plate device being actuated by means of an actuator device connected thereto, and wherein movement of said plate device adjusts said cross sectional area of said venture section (62, 64).

16. The gas condenser (2) of claim 15, wherein said at least one plate device is a flap (102, 104), an upper section of said flap (102, 104) being rotatably connected to said housing (36), and a lower section of said flap (102, 104) being movably connected to said gas chamber (16) via at least one stay (110, 112, 112').

17. The gas condenser (2) of claim 1, further comprising at least one actuator device for elevating and lowering said gas chamber (16) relative to said housing (36), thereby adjusting said cross sectional area of said venturi section (62, 64).

18. The gas condenser (2) of claim 1, wherein an upper section of said condensing chamber (98) is provided with at least one grate (94, 94', 96, 96') located downstream of said at least one venturi section (62, 64), said grate (94, 94', 96, 96') breaking up bubbles of gas (4) in said resultant mixture (92) when flowing through said grate (94, 94', 96, 96'), thereby facilitating absorption of said gas (4) into said liquid (6).

19. The gas condenser (2) of claim 4, wherein a varying number of apertures are made available for through-flow of gas (4) by means of a movable plate covering said apertures, said movable plate being actuated by means of a an actuator device.

20. The gas condenser (2) of claim 1, wherein said gas chamber (16) and said housing (36) are comprised of cylindrical pipes, thereby forming a pipe-in-pipe assembly, wherein at least one of said two pipes is of varying pipe diameter, said pipe assembly thus forming said venturi section (62, 64) and an expansion section (88, 90) located downstream thereof for conveying said resultant mixture (92) of gas (4) and liquid (6).

21. The gas condenser (2) of claim 1, wherein said gas is emitted from the interior of said gas chamber (16) to the exterior of said gas chamber (16).

* * * * *

UNITED STATES PATENT AND TRADEMARK OFFICE
CERTIFICATE OF CORRECTION

PATENT NO. : 6,786,063 B2
DATED : September 7, 2004
INVENTOR(S) : Helge-Ruben Halse It is certified that error appears in the above-identified patent and that said Letters Patent is hereby corrected as shown below:

Column 18,
Line 42, after "(16)" insert -- receiving said gas (4) from said gas supply conduit (8), and said gas chamber (16) --;
Line 51, delete "condenses" and substitute therefor -- condensed --;
Line 52, delete "for" and substitute therefor -- form --;
Line 59, delete "connects" and substitute therefor -- connected --;
Line 65, after "which" insert -- said --.

Signed and Sealed this

Thirteenth Day of September, 2005

JON W. DUDAS
*Director of the United States Patent and Trademark Office*